Oct. 10, 1939.                A. D. FORBES                2,175,889
                        OVERLOAD PROTECTIVE MEANS
                           Filed June 20, 1936
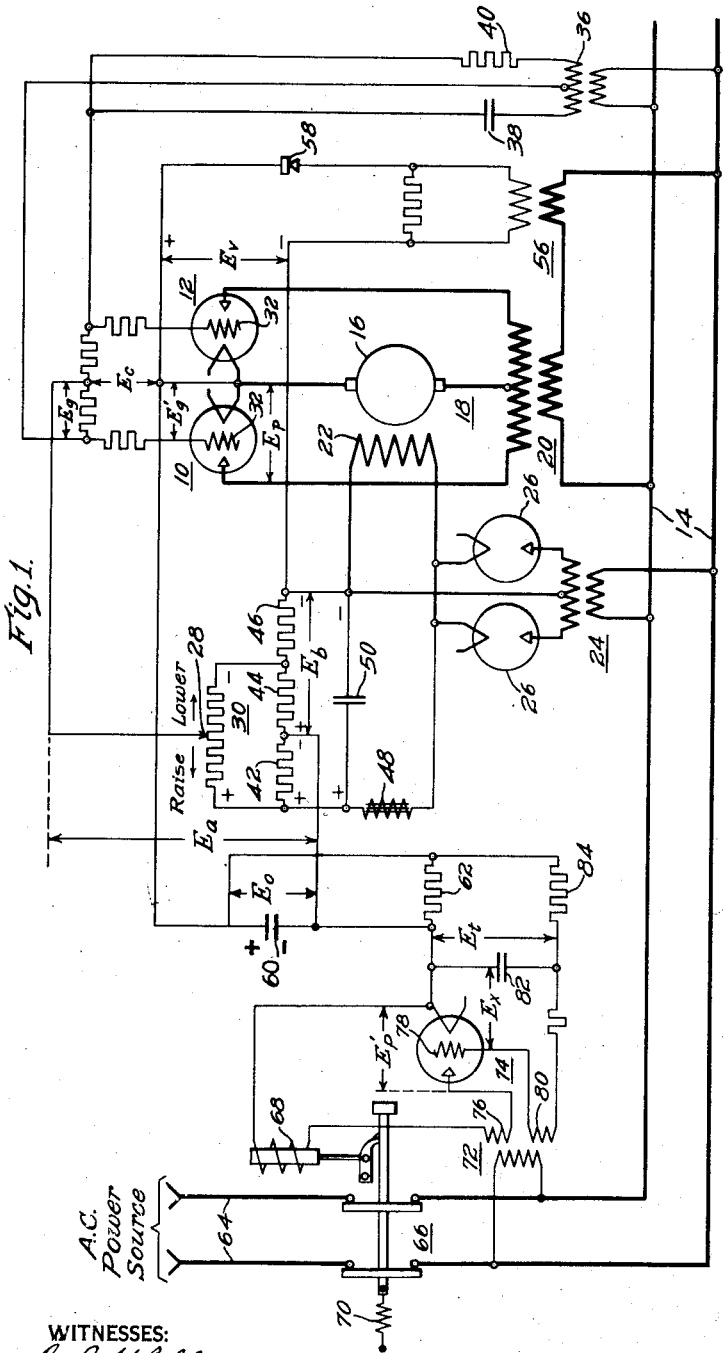
INVENTOR
Allan D. Forbes.

Patented Oct. 10, 1939

2,175,889

UNITED STATES PATENT OFFICE 2,175,889

OVERLOAD PROTECTIVE MEANS

Allan D. Forbes, Sharon, Pa., assignor to Westinghouse Electric & Manufacturing Company, East Pittsburgh, Pa., a corporation of Pennsylvania Application June 20, 1936, Serial No. 86,313

4 Claims. (Cl. 171—119)

My invention relates to the protection of electronic tubes through which current is supplied to an electrical translating device and it has particular relation to improved excess-current protective means for tubes of the grid-controlled type through which rectified current is supplied to a direct current motor from an alternating-current source of power.

The possibility of overloading is rather great in motor speed-control systems of the type under consideration. Electronic tubes suitable for use in such systems are subject to serious damage if the current carried exceeds given limits. My invention is directed to improved means for protecting the tubes.

Generally stated, the object of my invention is to facilitate the protection against excess currents of power-transmitting electronic tubes.

Another object is to provide an arrangement whereby the grid-controlled tubes utilized in the supply circuit of a motor or other electrical translating device may be caused automatically to shirk current loadings in excess of a given or safe maximum value.

A further object is to provide, in a system of the above type, means adapted to shut down or disconnect the system from its power source in case the tendency toward overload on the tubes persists beyond a given time.

My invention itself together with additional objects and advantages thereof will best be understood through the following description of a specific embodiment when taken in conjunction with the accompanying drawing, in which:

Figure 1 is a diagrammatic view of apparatus and circuits showing the improved protective means of my invention applied to the grid-controlled rectifier tubes utilized in the power supply and speed adjusting circuit of an alternating-current-energized direct-current motor.

Fig. 2 is a diagram of curves applicable to the protected tubes which form a part of the system of Fig. 1.

Fig. 3 is a similar diagram of curves applicable to the tube utilized in the sustained-overload protective means of Fig. 1.

In Fig. 1, I have represented the protective means of my invention as applied to the grid controlled rectifier tubes 10 and 12 through which uni-directional current is supplied from an alternating current power circuit 14 to the armature winding 16 of a direct current motor 18. A transformer 20 is included in the illustrated full wave rectifying circuit. The field winding 22 of the motor is shown as being supplied with energizing current through a connection which includes a transformer 24 and a pair of rectifiers 26.

Whereas the excitation supply rectifiers 26 may be of the non-controllable type illustrated, the tubes 10 and 12 in the armature supply circuit are of a well known grid controlled gas filled type having the characteristics depicted in Fig. 2, and affording a wide range in their effective conductivity properties. This latter is taken advantage of to control the speed of motor 18. In the system shown this control is effected by shifting the position of a tap 28 along the resistor of a speed-adjusting potentiometer 30.

In Fig. 2, $E_p$ represents the wave of power voltage applied between the anode and cathode elements of one of the tubes 10 or 12. Curve $k$ is the critical grid characteristic of the tube o the corresponding voltage which, when applied to the grid element 32, will prevent conduction of current during each positive half cycle of anode voltage $E_p$.

To cause the tube to break down and conduct current during an adjustable portion of each positive half cycle, it is customary to supply to the grid element a wave voltage $E_g$ which is so displaced from the wave of anode voltage as to cross the characteristic curve $k$ at some point 34 (Fig. 2) and thereby cause conduction. Once instituted this current flow continues during the remainder of the half cycle, but ceases when the anode voltage becomes zero. In this manner the motor armature 16 is supplied with the necessary rectified energizing current. In the system illustrated, this displaced grid voltage $E_g$ is supplied from circuit 14 through a transformer 36 and a well known interconnection involving a capacitor 38 and a resistor 40, the output voltage of which lags the input voltage by substantially 90°.

Adjustment in the effective current supplied to the motor armature 16 is attained by superimposing upon the displaced wave of grid voltage $E_g$ a direct current potential $E_c$ which is derived through speed-adjusting potentiometer 30 from a connection with potential dividing resistors 42, 44 and 46. These resistors are supplied through filtering devices 48 and 50 with a measure of the direct-current voltage which energizes field winding 22.

When, as illustrated in Fig. 2, $E_c$ has a negative value, it displaces the grd voltage wave to position $E'_g$ thereby delaying current conduction to a later point 54 in each positive half cycle, and reducing the current supplied to the motor armature. In a similar manner when the potentiometer 30 is so adjusted as to make $E_c$ positive in value, the shift of conduction starting point is in the opposite direction and the current passed by tubes 10 and 12 is correspondingly increased. The above changes, of course, produce corresponding lowering and raising adjustments in the speed of motor 18.

As applied to the system just described, the tube protecting means of my invention include means for introducing into the circuit through which conductivity adjusting voltage $E_c$ is supplied a modifying potential $E_o$ which diminishes the tube conductivity in accordance with the amount by which the current exceeds a given value. This causes the tubes automatically to shirk loads above the value for which they are designed.

In accomplishing the above objective, I prefer to utilize a current transformer 56 serially connected with the main transformer 20 through which power current is supplied to the motor 18. The output circuit of this current transformer includes a rectifier 58, the voltage dividing resistors 44 and 46 and a capacitor 60 which, together with a parallel connected discharge resistor 62, forms a part of the circuit through which tube control potential $E_c$ is supplied. This circuit is so arranged that $E_c$ represents the summation of speed adjusting voltage $E_a$, determined by the setting of potentiometer 30, and voltage $E_o$ appearing across the capacitor 60.

In operation of these protective means, as long as the current supplied to motor 18 through tubes 10 and 12 and transformer 20 remains below a given maximum safe value, the rectified voltage $E_v$ supplied by transformer 56 will be less than the opposing and substantially constant voltage $E_b$ appearing across resistors 44 and 46. In such a case, no charging current whatever will be supplied to capacitor 60 and $E_o$ will be zero. The tube conductivity will, under these conditions, be determined solely by the adjustment of potentiometer 30.

However, should the tube current exceed the given or safe value mentioned, then $E_v$ overbalances $E_b$ and charges capacitor 60 to a potential $E_o$ determined by the amount of excess voltage. $E_v$ so combines, as already stated, with $E_a$ as to modify $E_c$ in the conductivity lowering direction. As reference to Fig. 2 will show, $E_c$ is, in effect, increased in the negative direction, thereby delaying to a later point in each half cycle the initiation of tube conductivity.

This action causes tubes 10 and 12 to tend to shirk load when the current passed therethrough exceeds the aforementioned safe value. By proper correlation or proportioning of the several elements of the system, this tendency may be made sufficiently strong to minimize danger. In the majority of instances, therefore, it will be found entirely adequate for protecting the tubes against overload.

It is desirable, however, in a system of the class under discussion that the tendency toward sustained overload be checked if it persists too long, and for the purpose of achieving this further feature, I provide the additional means shown at the left of Fig. 1 which serve to disconnect the entire system from the power source 64 whenever the load-shirking apparatus just described is retained in continuous operation in excess of a given time.

This disconnection may be effected in any well known manner such as by the use of a circuit interrupter 66 provided with a tripping winding 68 which when energized allows a spring 70 to move the main contact members to the left thereby interrupting the main power circuit. Energizing current for this winding is supplied through a transformer 72, in the output circuit of which a grid-controlled tube 74 is included.

The characteristics of this tube are similar to those of previously described power-current transmitting tubes 10 and 12. They are depicted in Fig. 3 wherein $E'_p$ represents the voltage supplied by transformer winding 76 to the tube anode circuit, $k'$ the corresponding critical grid characteristic and $E_x$ the wave of voltage supplied to the grid element 78 from winding 80 through a circuit which includes a capacitor 82. This voltage is substantially 180° out of phase with the tube anode voltage.

Under these conditions there is no intersection with curve $k'$ and tube 74 is prevented from conducting current. Capacitor 82 is interconnected with the before-mentioned capacitor 60 in such manner that any voltage $E_o$ appearing thereacross will, after a time delay determined by the size of resistor 84, charge capacitor 82.

The result is that when voltage $E_o$, which we have seen appears only when the loading of protected tubes 10 and 12 exceed the given value, remains of a sufficient magnitude for a sufficient length of time, the voltage $E_t$ across capacitor 82 will rise to a value sufficient to shift the wave $E_x$ of grid voltage to position $E'_x$ where it intersects critical curve $k'$ and causes tube 74 to break down and conduct current during each positive half cycle of anode voltage.

This current passes through the trip winding 68 and effects the opening of the main power switch 66 to disconnect the entire system from the power source 64 before damage can result.

Resistor 62 provides a discharge path for both of the capacitors 60 and 82 so that once the overload conditions on the tubes 10 and 12 have subsided or been removed, both of these devices return to zero voltage, thereby permitting motor 18 to be operated in normal manner.

It will be understood that while my improved protective system has been described in connection with electronic tubes which supply rectified current to a direct current motor, it is by no means restricted to this single application but may with equal success be applied to any system wherein an electrical translating device is supplied with energizing current through electronic tubes of restricted current carrying capacity.

Hence, although I have shown and described a certain specific embodiment of my invention, I am fully aware that many modifications thereof are possible. My invention, therefore, is not to be restricted except insofar as is necessitated by the prior art and by the scope of the appended claims.

I claim as my invention:

1. In a system comprising an electrical translating device and means, including an electronic tube, for supplying energizing current thereto from a source of power, the combination of means for producing a potential determined by the amount by which the tube current exceeds a given value, a capacitor, means for causing said potential to circulate a charging current through the capacitor and means sensitive to an attainment by the capacitor of a given voltage for disconnecting said system from said power source.

2. In a system comprising an electrical translating device, means, including an electronic tube, adapted to supply energizing current thereto, from a source of power, and a circuit for impressing upon said tube a voltage which determines its effective conductivity, the combination of means for introducing into said control circuit a modifying potential which diminishes said conductivity in accordance with the amount by which the tube current exceeds a given value and means for disconnecting said system from the power source when the tube current exceeds said given value for a predetermined sustained time.

3. In a system comprising an electrical translating device and means including a grid controlled rectifier for supplying a unidirectional current thereto from an alternating current source of energy, a grid circuit for controlling the conductivity of said rectifier, means for supplying an alternating voltage wave to the grid control circuit that is out of phase with the anode voltage wave, manually controlled means for introducing a unidirectional voltage component into said grid circuit for adjusting the conducticity of the rectifier, means for introducing a unidirectional voltage component into said grid circuit that varies in response to the load current to said translating device for decreasing the conductivity of said rectifier with increasing load current, and means responsive to a predetermined value of said last named voltage component for interrupting the load circuit.

4. In a system comprising an electrical translating device and means including a grid controlled rectifier for supplying a unidirectional current thereto from an alternating current source of energy, a grid circuit for controlling the conductivity of said rectifier, means including a manually adjustable potentiometer for introducing a controlled unidirectional voltage component into said grid circuit for adjusting the conductivity of the rectifier, a capacitor in said grid circuit, means effective above a predetermined load current through said rectifier for impressing a unidirectional voltage component accross said condenser that varies in accordance with load current for decreasing the conductivity of said rectifier with increasing load current, and means including an electronic tube responsive to a predetermined voltage across said capacitor for interrupting the load circuit through said rectifier.

ALLAN D. FORBES.